US011302955B2

(12) United States Patent
Campbell et al.

(10) Patent No.: US 11,302,955 B2
(45) Date of Patent: Apr. 12, 2022

(54) BATTERY CELL DESIGN WITH A COATED LITHIUM REFERENCE ELECTRODE

(71) Applicant: CHONGQING JINKANG POWERTRAIN NEW ENERGY CO., LTD., Chongqing (CN)

(72) Inventors: Brennan Campbell, Santa Clara, CA (US); Ying Liu, Santa Clara, CA (US); Yifan Tang, Santa Clara, CA (US)

(73) Assignee: CHONGQING JINKANG POWERTRAIN NEW ENERGY CO., LTD., Chongqing (CN)

( * ) Notice: Subject to any disclaimer, the term of this patent is extended or adjusted under 35 U.S.C. 154(b) by 0 days.

(21) Appl. No.: 16/373,621

(22) Filed: Apr. 2, 2019

(65) Prior Publication Data

US 2020/0321651 A1    Oct. 8, 2020

(51) Int. Cl.
*H01M 10/0525* (2010.01)
*B60L 58/22* (2019.01)
*H01M 4/04* (2006.01)
*B60L 50/64* (2019.01)

(52) U.S. Cl.
CPC ......... *H01M 10/0525* (2013.01); *B60L 50/64* (2019.02); *B60L 58/22* (2019.02); *H01M 4/04* (2013.01)

(58) Field of Classification Search
CPC ..... H01M 10/0525; H01M 4/04; B60L 50/64; B60L 58/22
See application file for complete search history.

(56) References Cited

U.S. PATENT DOCUMENTS

| 8,163,410 | B2 * | 4/2012 | Fulop | G01R 31/54 429/61 |
| 2012/0027926 | A1 * | 2/2012 | Miyuki | H01M 4/36 427/78 |
| 2018/0114976 | A1 * | 4/2018 | Lee | H01M 4/622 |
| 2018/0301693 | A1 * | 10/2018 | Choi | H01M 4/62 |
| 2019/0094309 | A1 * | 3/2019 | Cho | G01R 31/396 |
| 2019/0312312 | A1 * | 10/2019 | Ensling | H01M 4/134 |

OTHER PUBLICATIONS

Belt et al. "Development and Use of a Lithium-Metal Reference Electrode in Aging Studies of Lithium-Ion Batteries." Journal of the Electrochemical Society, 161 (6) A1116-A1126 (2014) (Year: 2014).*
Kim et al. "Improved Cycling Stability of Lithium Electrodes in Rechargeable Lithium Batteries." Journal of the Electrochemical Society, 161 (1) A53-A57 (2014) (Year: 2014).*
Raccichini et al. "Critical Review of the Use of Reference Electrodes in Li-Ion Batteries: A Diagnostic Perspective." Batteries 2019, 5, 12 (Year: 2019).*

* cited by examiner

Primary Examiner — Michael L Dignan
(74) Attorney, Agent, or Firm — Cooper Legal Group, LLC

(57) ABSTRACT

A battery cell providing a coated lithium reference lead includes at least one anode layer, at least one cathode layer, and a reference lead. The reference lead includes a conductive wire, a layer of lithium metal coupled to the conductive wire, and a polymer coating that covers the layer of lithium metal. The reference lead is inserted into the battery cell with the at least one anode layer and the at least one cathode layer.

11 Claims, 14 Drawing Sheets

BATTERY CELL DESIGN WITH A COATED LITHIUM REFERENCE ELECTRODE

BACKGROUND

Lithium-ion ("Li-ion") batteries are extensively used for energy storage applications. These applications include powering electric vehicles ("EVs") and personal electric devices, such as laptops computers, digital music players, smart phones, and so forth. Li-ion batteries are particularly advantageous in these application due to their high energy density, high operational voltage, and low self-discharge rate. However, despite their widespread use and growing popularity, serious technical challenges remain in the use of Li-ion cells. These challenges include range per charge, charging time, cost, safety, and most importantly, cell lifetime. These challenges are especially pronounced in EV applications where long-term cycling and lifetimes of 10-15 years are expected.

Battery cells are an intensely complicated mesh of side reactions, non-equilibrium kinetics, and fluctuations in electrical potential that are difficult to characterize from outside observation of the anode and cathode alone. Typically, in order to investigate the detailed non-equilibrium kinetics and thermodynamics of electrochemical cells, special construction of a three-electrode cell is required. A three-electrode cell is a cell in which a "reference electrode" is placed in the battery cell. However, the reference electrode must also stay electrically isolated from the actual working of the electrodes. This allows the reference electrode to act as a stable, known electrochemical potential with which to compare measured potentials at the anode and cathode terminals. This allows for the ready calculation of individual electrode potentials instead of simply measuring the book electrochemical potential difference between the electrodes. This also allows for measurement of kinetic variables and/or constants, such as the over-potential, while tracking the prevalence and impact of additional side reactions within the cell.

BRIEF SUMMARY

In some embodiments, a battery cell providing a coated lithium reference lead may include at least one anode layer, at least one cathode layer, and a reference lead. The reference lead include a conductive wire, a layer of lithium metal coupled to the conductive wire, and a polymer coating that covers the layer of lithium metal. The reference lead may be inserted into the battery cell with the at least one anode layer and the at least one cathode layer.

In some embodiments, a method of providing a battery cell with a coated lithium reference lead may include forming a reference lead by coupling a layer of lithium metal to a conductive wire, and coating the layer of lithium metal and a least a portion of the conductive wire with a polymer coating. The method may also include inserting the reference lead into the battery cell with at least one anode layer and at least one cathode layer.

In any embodiments, any of the following features may be included in any combination and without limitation. The polymer coating may also cover at least a portion of the conductive wire. The polymer may be a conductive polymer. The conductive polymer may be an ionically conductive polymer. The layer of lithium metal may be pressed onto an end length of the conductive wire. After the layer of lithium metal is coupled to the conductive wire, the layer of lithium metal and the conductive wire may be dipped into the polymer. The battery cell may include a jelly roll comprising the at least one anode layer and the at least one cathode layer. The reference lead may be inserted between layers of the at least one anode layer and the at least one cathode layer in the jelly roll. The battery cell may be a prismatic cell. The battery cell may be a pouch cell. The battery cell may also include an electrolyte, where the reference lead may be inserted into the electrolyte. An electrical measurement may be obtained between the at least one anode layer and the reference lead. An electrical measurement may be obtained between the at least one cathode layer and the reference lead. An electrical measurement using the reference lead may be provided to a Battery Management System (BMS) of an electric vehicle. An electrical measurement may be provided using the reference lead to a laboratory test meter. At least one anode layer and the at least one cathode layer may be inserted into a battery can, and the battery can may be crimped around a battery cap such that the reference lead runs between the battery can and the battery cap. The battery cell may also include a dual-electrode cap. One of the at least one anode layer and the at least one cathode layer may be coupled to a first electrode of the dual-electrode cap. The reference lead may be coupled to a second electrode of the dual-electrode cap. Power may be provided from the battery cell to an electric motor of an electric vehicle.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1A:
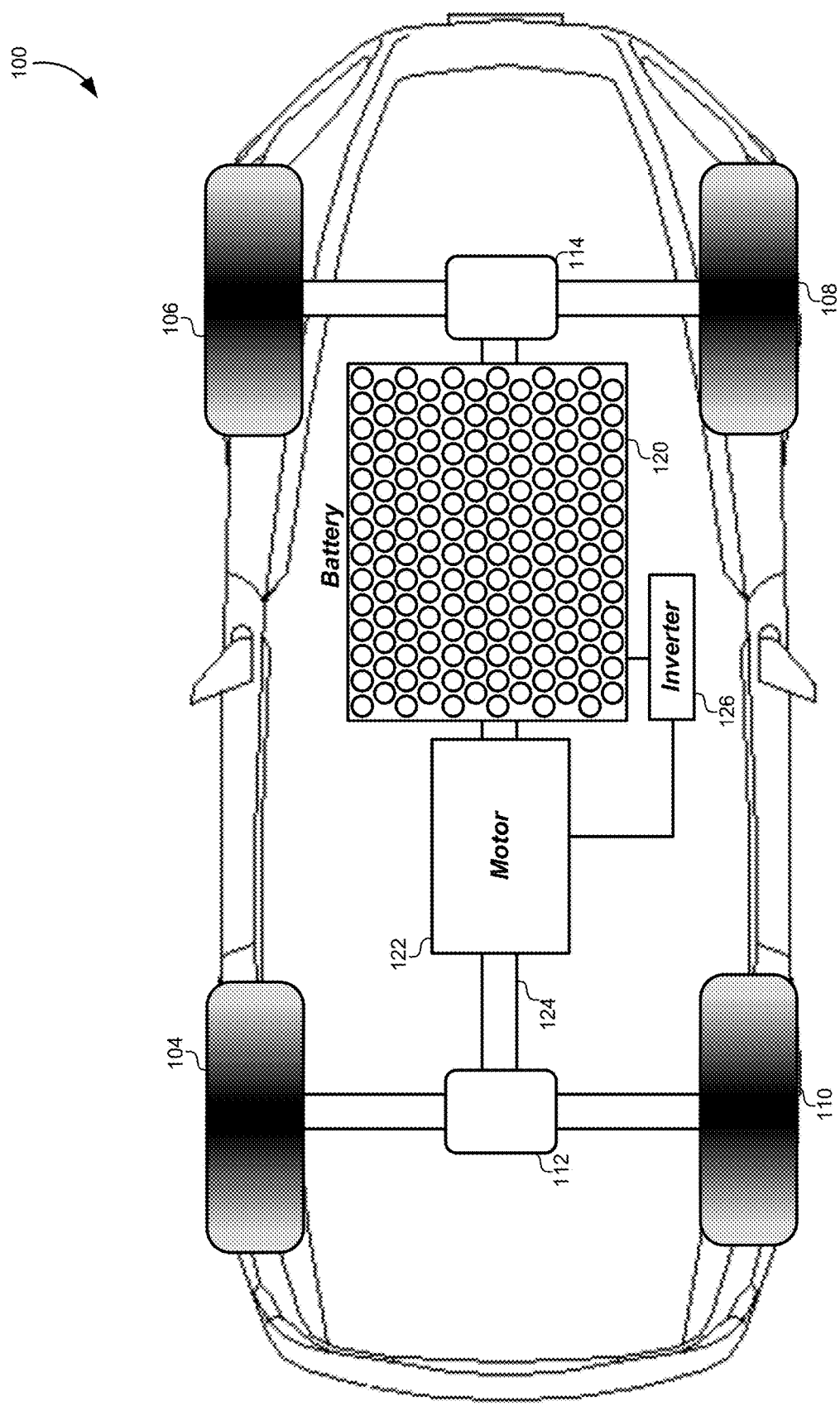
FIG. 1A illustrates a simplified diagram of a drivetrain of an electric vehicle, according to some embodiments.

Described herein, are embodiments for a coated lithium metal reference lead for commercial battery cells. Lithium metal has been found to be an ideal material to use as a third reference lead in addition to the anode and cathode of a battery cell. However, lithium metal inserted into the corrosive interior of the battery cell tends to degrade rapidly and skew battery measurements. Therefore, the embodiments described herein provide for a lithium metal strip that can be coupled to a conductive wire. The combination of the lithium metal and the wire can be coated with a conductive polymer to protect the lithium metal while still allowing electrical access to the interior of the battery cell. The coated reference lead can then be inserted into a traditional battery cell with the anode/cathode layers. This reference lead can then provide additional measurements to the Battery Management System of an electric vehicle during commercial use for real-time diagnostic information about the battery.

Lithium ion battery cells are seeing widespread use in commercial, residential, and automotive applications. However, one of the barriers that prevents lithium-ion batteries from replacing traditional energy technologies is battery charging. For example, the automotive industry is still primarily powered by the traditional gasoline combustion engine. One of the distinct advantages of the combustion engine is how rapidly it can be refueled. For example, a stop at a gas station typically takes less than 5 minutes and can produce hundreds of miles of energy for a vehicle powered by a combustion engine. In contrast, electric vehicles powered by lithium-ion batteries can require more than 30 minutes to recharge the car's battery cells. It is this difference in the rate of refueling versus the rate of recharging that deters many individuals who would otherwise be likely to use an electric vehicle.

In order to make electric vehicles more palatable to the general public, battery charging cycles for electric vehicles should be made as short as possible. Therefore, the ability to rapidly charge lithium-ion batteries is of great importance to the industry. If the batteries in an electric vehicle can be recharged to an 80% state of charge (SOC) in under 30 minutes, electric vehicles may be much more competitive with traditional combustion engines. Therefore, the ability to rapidly charge lithium-ion batteries can provide technological improvements that affect energy efficiency, energy independence, environmental concerns, cost-effectiveness, and provide many other economic and societal benefits.

Additionally, the ability to characterize battery cells during charging and discharging cycles may be very useful for optimizing the charging time and/or lifecycle of the batteries. The first steps in designing lithium-ion cells that have storage capacity and charging times that can compete with combustion-engine vehicles are characterizing an understanding the molecular-level reactions that take place during use. Being able to measure electrical characteristics of the lithium battery cells beyond the bulk measurement between the anode and cathode may be essential for preventing battery degradation modes, lithium plating, lifecycle reductions, and other electrical phenomena that limit the capacity and charge time of electric vehicles.

Battery cells are comprised of an intensely complicated mesh of side reactions, non-equilibrium kinetics, and fluctuations in electrical potential that are difficult to characterize from outside observation of the anode and cathode alone. Typically, in order to investigate the detailed non-equilibrium kinetics and thermodynamics of electrochemical cells, special construction of a three-electrode cell is required. A three-electrode cell is a cell in which a "reference electrode" is placed in the battery cell. However, the reference electrode must also stay electrically isolated from the actual working electrodes. This allows the reference electrode to act as a stable, known electrochemical potential with which to compare measured potentials at the anode and cathode terminals. This also allows for the ready calculation of individual electrode potentials instead of simply measuring the bulk electrochemical potential difference between the electrodes. This additionally allows for the measurement of kinetic variables and/or constants such as an over-potential while tracking the prevalence and impact of additional side reactions within the cell.

However, prior to this disclosure, constructing a three-electrode cell was a very error-prone and time/labor-intensive process. The known techniques for constructing three-electrode cells were rudimentary at best and required precise techniques to avoid interfering with the normal operation of the battery. Precise alignment of the electrodes with one another was essential, otherwise the probability of anomalous results greatly increased. Furthermore, it is important to note that the dissection process previously used to create three-electrode cells was inherently invasive, and it was impossible to successfully remove the third electrode without influencing the final measurements of the cell. Typical three-electrode cells were not inherently useful for other forms of more conventional cycling analysis and characterization, nor could they be used for real-world applications.

To address these and other technology problems in the art, the embodiments described herein provide for a battery cell with a coated lithium electrode. For example, a lithium metal strip can be laminated in a film of ionically conductive polymer. This coating not only contributes to mechanical robustness of the lithium metal reference, but it also provides protection against the corrosive electrochemical environment found in a typical battery cell. This lithium reference has a simple geometry and a thickness that allows it to be readily included in traditional battery arrangements. For example, this reference can be added to a cell by inserting the coated lithium strip either between the outer jellyroll and the negative can, or between any of the negative/positive electrode layers within the jellyroll.

Before describing the coated lithium metal reference in detail, this disclosure will first describe one example operating environment where battery cells constructed with the coated lithium metal reference may be used. Although this example includes the environment of an electric vehicle operating with a plurality of battery cells in a Battery Management System, this environment is provided merely by way of example and is not meant to be limiting. Other operating environments may include consumer electronics, cell phones, tablet computers, laptop computers, health and safety equipment, and so forth.

FIG. 1A illustrates a simplified diagram of a drivetrain of an electric vehicle 100, according to some embodiments. The operating conditions and requirements for use in an electric vehicle may be particularly well-suited for the three-electrode cells described herein. The electric vehicle 100 includes a battery 120. The battery 120 may typically be comprised of a plurality of individual battery cells. For example, the battery 120 may include hundreds of lithium-ion battery cells connected in parallel/serial configurations to provide a steady DC voltage and a large amount of current to power the electric vehicle 100. The battery 120 may also be equipped with a temperature management system (TMS) that regulates the temperature of the plurality of individual battery cells. For example, the TMS may include channels for circulating coolant and/or a "cold plate" adjacent to the plurality of individual battery cells. These elements can provide heat to the battery 120 in cold environments and/or remove heat from the battery 120 in warmer operating environments. The TMS can regulate the battery temperature 120 to ensure that the individual battery cells are charged and discharged within an ideal operating temperature range to avoid damage to the individual battery cells (e.g., lithium plating).

The battery 120 may provide DC current to an inverter 126. The inverter 126 can convert the DC current into an AC current that can be circulated through a stator of the motor 122. One or more rotors positioned inside of the stator in the motor 122 can be equipped with permanent magnets. For example, an interior permanent-magnet (IPM) motor or a surface permanent-magnet (SPM) motor may include permanent magnets that are mounted inside or outside of the bodies of the rotors. The windings in the stator through which the AC current flows generates a rotating magnetic field. The rotating magnetic field induces a current in the magnets of the rotors. It is the interaction between the field produced by the stator and the resulting current in the magnets that produces the driving force for the motor 122.

As the rotors of the motor 122 are rotated by virtue of the electric power provided by the battery 120, the rotors turn a shaft 124. Differential modules 112, 114 translate the rotational motion of the shaft 124 into orthogonal rotational motion for the wheels 104, 106, 108, 110 of the electric vehicle 100. In this simplified diagram, only a single motor 122 is used to drive each of the wheels 104, 106, 108, 110. However, other embodiments may use a plurality of motors, each of which drive a subset of the wheels 104, 106, 108, 110. For example, some embodiments may use a first motor to drive the rear wheels 104, 110 along with a second motor to drive the front wheels 106, 108. In these embodiments, a single battery 120 can power each of the plurality of motors, or multiple batteries may provide power to the plurality of motors.

Figure 1B:
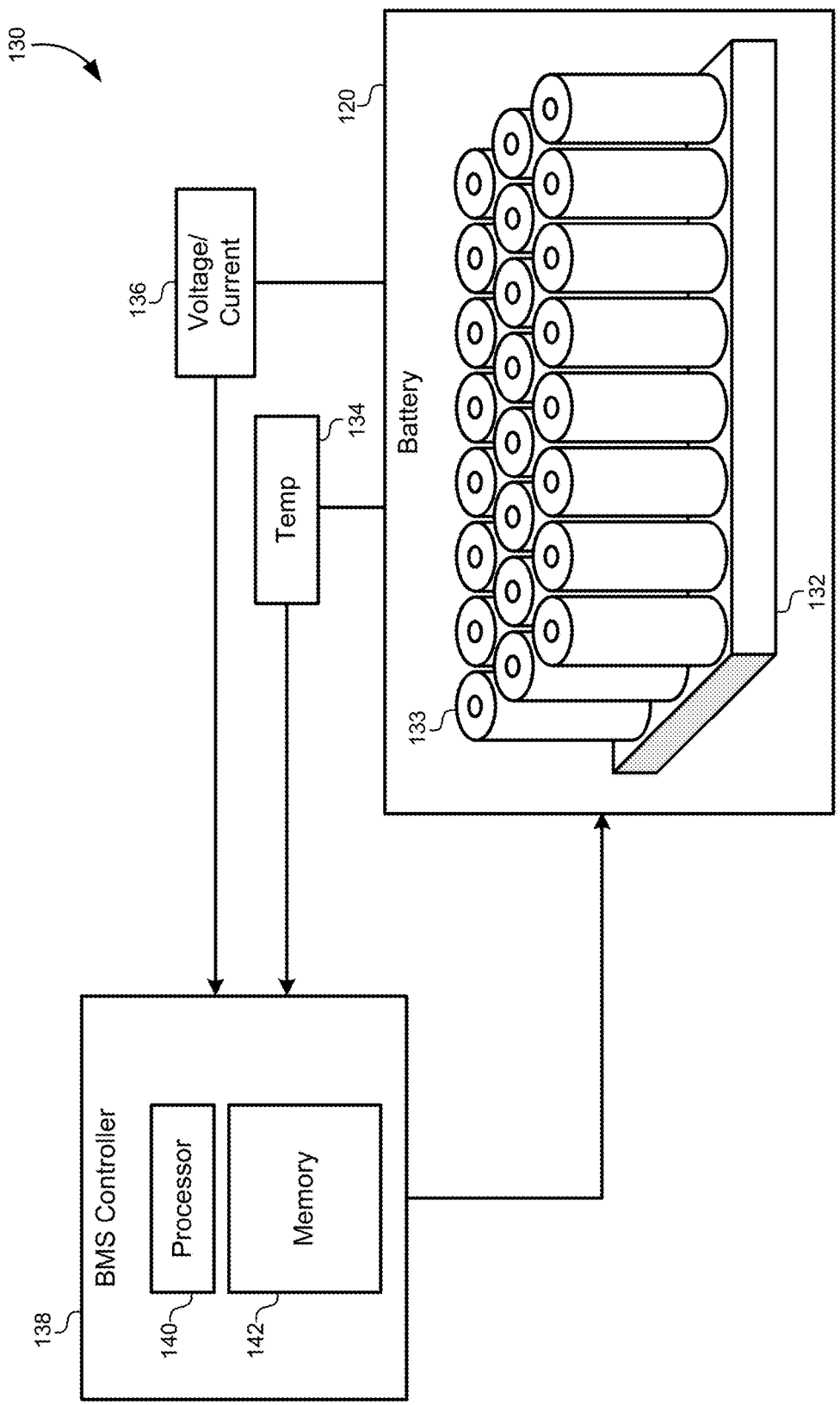
FIG. 1B illustrates a simplified block diagram of a Battery Management System (BMS) 130 that may be used in an electric vehicle, according to some embodiments.

FIG. 1B illustrates a simplified block diagram of a Battery Management System (BMS) 130 that may be used in an electric vehicle, according to some embodiments. As described above, the battery 120 may include a plurality of individual battery cells 133. The BMS 130 may include many electrical and mechanical components, only a portion of which are explicitly illustrated in FIG. 1B. For example, the BMS 130 may include a plurality of sensors, such as temperature sensors 134, voltage/current sensors 136, and other sensors configured to monitor the state and environment of the battery cells 133. Sensor readings may be processed by a BMS controller 138 that includes a processor 140, a memory 142, and other computer system components described in detail below in relation to FIG. 10.

To complete the control loop, the BMS 130 may include one or more devices that are configured to add or remove heat from the plurality of battery cells 133. For example, the BMS may include a TMS that includes a heat exchanger and heat transfer device(s) (e.g., a cold plate, coolant circulation tubes, radiant heating, ventilation, etc.) that can be used to regulate the temperature of the individual battery cells 133 during charging/discharging in the electric vehicle. The BMS 130 can use the control loop to perform a number of different thermal operations in relation to the plurality of battery cells 133. First, the BMS 130 can perform a cooling function that removes heat from the plurality of battery cells 133. For example, when the battery cells 133 reach their optimal temperature performance range, the BMS 130 can circulate liquid coolant through a heat transfer device to remove heat from the batteries 133. Second, the BMS 130 can provide heat to the batteries 133 during cold temperatures. For example, when charging or fast-charging batteries with temperatures below the optimal temperature range, the BMS 130 can heat the batteries 133 by circulating heated material (e.g., fluid, air, etc.) around the batteries 133. Some embodiments may also use electric heating to increase the temperature of the batteries 133. Some embodiments of the BMS 130 can also provide insulation around the batteries 133 to protect against extreme weather outside of the electric vehicle. The BMS 130 may also provide ventilation or air circulation in addition to the basic cooling/heating functions.

Another aspect of the control loop for the BMS 130 may include the monitoring and regulation of electrical characteristics of the battery cells 133. For example, the BMS controller 138 can use the voltage/current sensors 136 to monitor the output current and voltage of subsets of the individual battery cells 133. Prior to this disclosure, this monitoring was limited to the electrical characteristics that could be determined from the individual anodes/cathodes of the battery cells 133 alone. No three-electrode cells had been developed that could be reliably used in-situ during operation of the electric vehicle. However, the embodiments described herein provide the third electrode that can be additionally coupled to the voltage/current sensors 136 to characterize internal kinetics, current densities, reactions, and other electrochemical phenomena that were previously unmeasurable by the BMS 130. These new measurements can be processed by the BMS controller 138 and used to better control the voltage/current output of the battery 120, to better control efficient charging cycles, to better predict battery life cycles, and to increase the lifetime of the battery cells 133.

Figure 2:
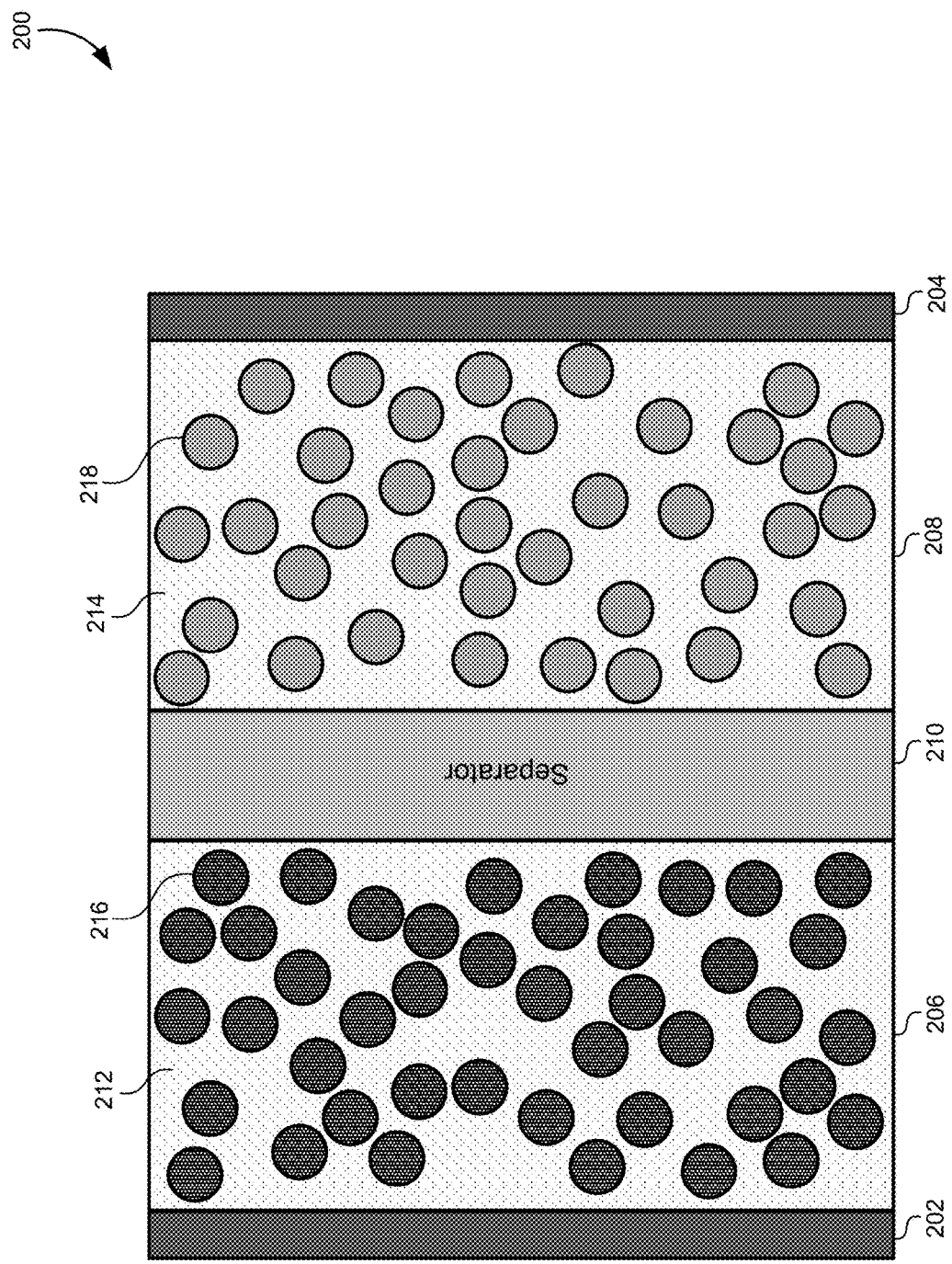
FIG. 2 illustrates a simplified diagram of the layers of a lithium battery used in electric vehicles, according to some embodiments.

FIG. 2 illustrates a simplified diagram of the layers of a lithium battery 200 that may be used in electric vehicles, according to some embodiments. A typical battery includes thin layers of material that are compressed together and rolled into a cylinder, "jelly roll," or "Swiss roll." The jelly roll design is commonly used in a majority of cylindrical rechargeable batteries. In this design, an insulating sheet may be provided, followed by a thin layer of anode material. Next, a separator layer may be applied, and a cathode material may be layered on top. These layers may then be rolled up and inserted into a hollow cylinder casing. As described below, the battery cell may then be sealed, and metal contacts for the anode and/or cathode at the top and bottom of the jelly roll can be coupled to the case and/or cap of the battery. Specifically, the jelly roll may include anode and cathode leads that are connected to terminals of a battery housing that encases and protects the jelly roll. In some embodiments, the anode and cathode can both be coupled to a top cap of the battery cell. FIG. 2 illustrates each of these layers in detail. These layers not only represent the physical layers in an actual lithium battery, they also represent a basic physics model using porous electrode and concentrated solution theories that accurately captures lithium ion migration inside the battery.

A lithium battery may include a pair of current collectors 202, 204 that are connected to the anode and cathode leads respectively. The anode current collector 202 may comprise a sheet of copper, and the cathode current collector 204 may comprise a sheet of aluminum, although other materials may be used for either current collector 202, 204. The battery 200 may include a negative anode electrode 206 and a positive cathode electrode 208 that are isolated by a separator 210. Each electrode 206, 208 may include active particles 216, 218 and electrolyte solutions 212, 214. According to this physics model, the electrolyte phase may be continuous across the anode 206, separator 210, and cathode 208, with a solid particles phase that exists in the anode 206 and cathode 208. The solid active materials 216, 218 can be modeled as a matrix of mono-sized spherical particles as illustrated in FIG. 2.

During the discharge process, lithium may be diffused to the surface of the anode 206 and may undergo an electrochemical reaction. This reaction results in the release of electrons and transfers lithium to the electrolyte phase. The lithium ions may diffuse and conduct through the electrolyte 212, 214 from the anode 206 to the cathode 208 where a similar reaction transfers lithium to the positive solid phase. Lithium is then stored inside the active materials 218 of the cathode 208 as the battery 200 is discharged. Charging the battery 200 can be modeled using the opposite process described above. This lithium-ion transport process in the porous electrode and electrolyte solution can be described by charge and mass conservation laws. For example, charge conservation governs phase potentials, while mass conservation governs the phase concentrations of the electrolyte and solid phases in the chemistry of the battery 200.

Figure 3:
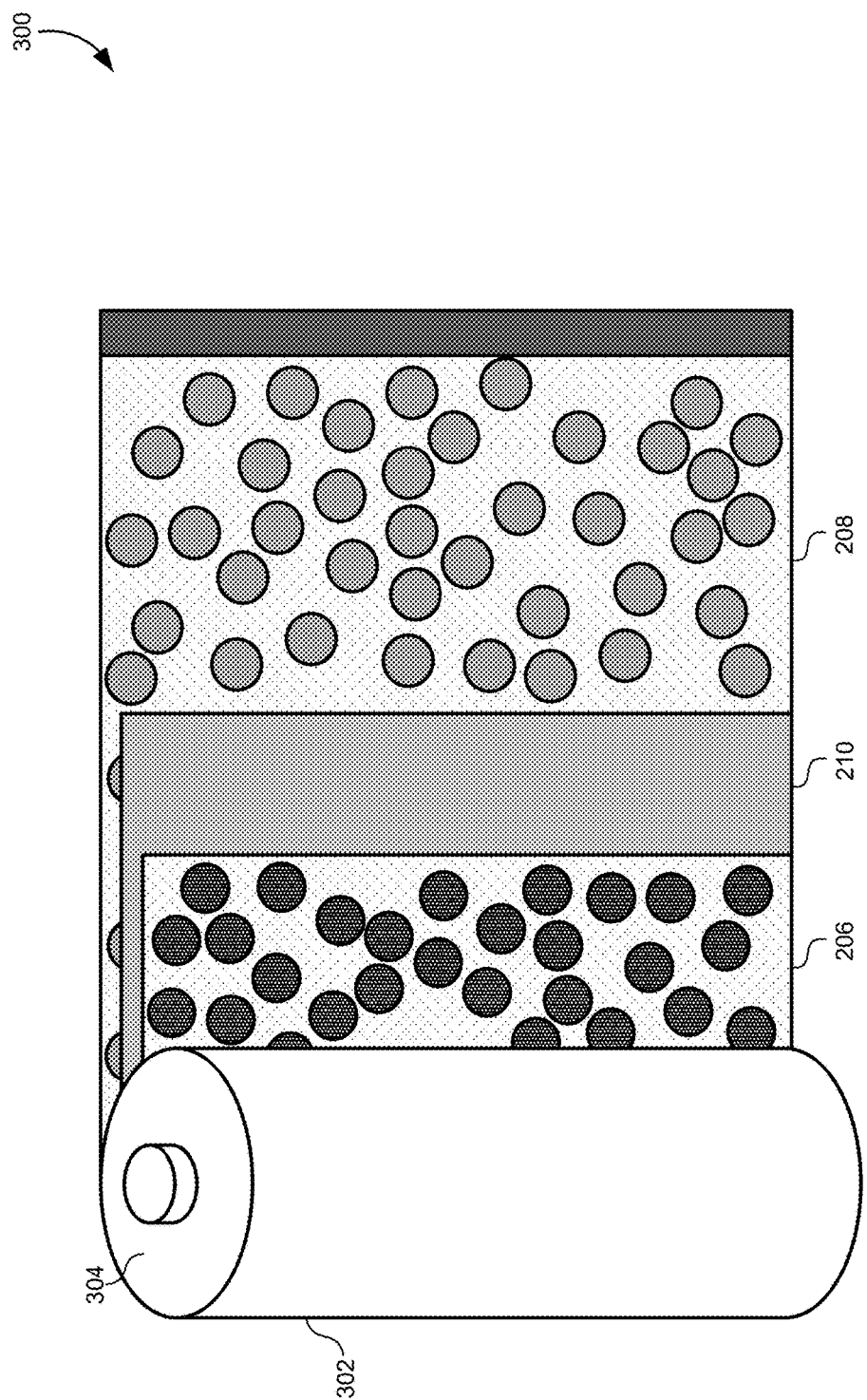
FIG. 3 illustrates a simplified diagram of how the various chemistry layers may be rolled up inside of a battery in a jelly roll configuration, according to some embodiments.

FIG. 3 illustrates a simplified diagram of how the various chemistry layers may be rolled up inside of a battery 300 in a jelly roll configuration, according to some embodiments. Each of the layers described in the model above can be placed in thin sheets on top of each other and rolled up into a cylinder inside of the housing of the battery 200. For example, the anode 206 may include a thin layer of graphite. The cathode 206 may use a layer of the lithium oxide family (e.g., lithium cobalt oxide, lithium manganese oxide, etc.). Each of these layers may be approximately uniform vertically within the battery 200. Therefore, under ideal conditions, current may flow back and forth between the anode 206 and the cathode 208 uniformly at the bottom of the battery 200 and the top of the battery 200, resulting in a nearly uniform current density throughout.

Figure 4:
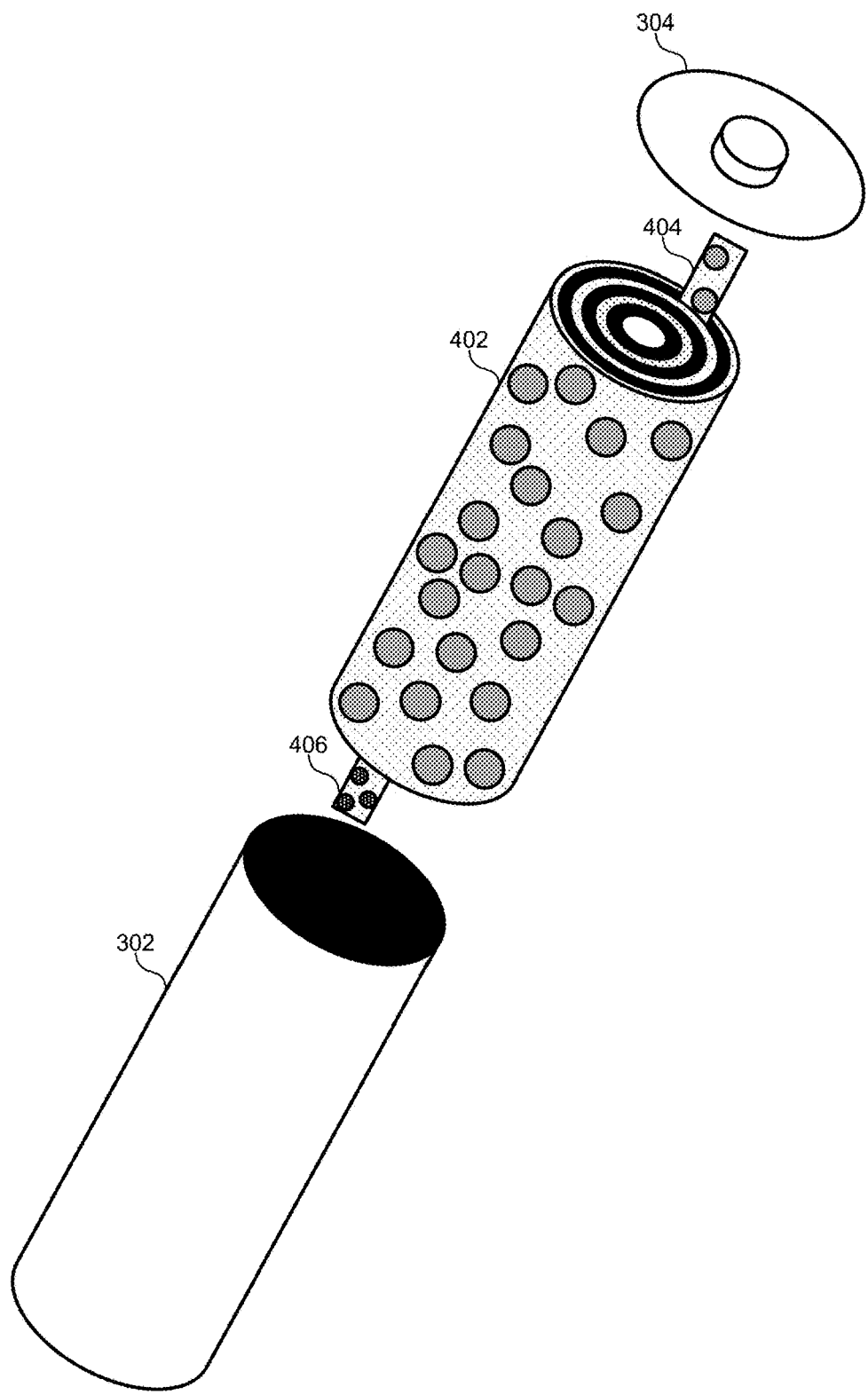
FIG. 4 illustrates a diagram of a traditional battery cell.

FIG. 4 illustrates a diagram of a traditional battery cell. The traditional battery cell includes a jelly roll 402, a case or "can" 302, and a cap 304. The jelly roll 402 can be rolled up into a cylinder and inserted into the can 302. Afterwards, the cap 304 can be attached to the top of the can 302. The cap 304 can be electrically isolated by an insulator from the can 302. In some embodiments, the can 302 may include an insulator wrapper or case around the exterior of the can such that only the bottom of the can 302 is exposed. The jelly roll 402 may include an electrical lead for the anode 406 and an electrical lead for the cathode 404. The electrical lead for the anode 406 can be coupled to the can 302 such that the can 302 acts as the anode electrode. Similarly, the electrical lead for the cathode 404 can be electrically coupled to the cap 304 such that the entirety of the cap 304 acts as the cathode electrode.

The physical arrangement and assembly process illustrated in FIG. 4 is made possible because in each jelly roll configuration prior to this disclosure, the electrical lead for the anode 406 and the electrical lead for the cathode 404 were located on opposite ends of the cylinder of the jelly roll 402. To generate a third electrical lead in this configuration, holes had to be punched in the layers of the anode and cathode, lined up precisely, and a lithium strip had to be inserted through the anode and cathode layers. The third electrode then had to be threaded between the cap 304 and the can 302 in the final assembly process. This resulted in an invasive procedure that fundamentally altered the electrical characteristics of the battery cell and generally made the battery cell unsuitable for practical applications.

The embodiments described herein integrate a third reference electrode into a commercially viable battery cell such that the electrical characteristics of the anode and cathode can be independently measured outside of a laboratory environment and in an operating environment. Specifically, these embodiments can be integrated into existing BMS systems to provide real-time electrical measurements to an electric vehicle. These measurements can be used to govern the charging, discharge rate, lifecycle, current draw, and/or other usage of battery cells in the overall operation of the electric vehicle. The BMS can then accurately predict the state-of-charge (SoC), state-of-power (SoP), and state-of-health (SoH) as battery cells degrade during charge and discharge cycles within the battery pack of the electric vehicle.

There are number of different degradation mechanisms that will occur within each individual battery cell in the electric vehicle. Therefore, the electrochemical potentials may differ from cell to cell, as well as over the lifetime of a single battery cell. However, in order to properly characterize these degradation mechanisms, specific information from the individual electrodes within the battery cells and their voltage profiles may need to be obtained. These voltage profiles can provide a more accurate picture of the battery cell's current state and dynamic behavior. For example, the anode and cathode potentials may be of importance, thus these embodiments can separate the potentials of the positive and negative electrodes and analyze them individually with respect to the third reference provided by the coated lithium metal lead described herein.

The embodiments described herein use a lithium metal reference to provide this type of independent monitoring from a third electrode. While this type of electrode can be designed using various reference materials with a voltage sense, the most direct and accurate material has been found to be lithium metal. However, it is been discovered that simply providing a lead made from lithium metal is not chemically or mechanically straightforward. Specifically, there are both mechanical and chemical issues that lead to the rapid degradation of lithium metal in the same environment as lithium-ion electrodes. The degradation of a bare lithium metal reference leads to compromised electrical readings and a shortened lifetime.

The degradation of lithium metal in the same environment as the lithium-ion electrodes first includes the buildup of a solid-electrolyte interface (SEI) passivation layer. Specifically, when the lithium metal is exposed to the electrolyte of the battery cell, an SEI layer is formed on electrode surfaces from decomposition products of the electrolyte. The SEI layer can interfere with the electrical readings provided by the lithium reference. Second, bare lithium electrodes can experience the loss of lithium metal (i.e., "dead lithium") through a phenomenon known as lithium plating or through the formation of the SEI layer. Third, the lithium metal can begin to undergo lithium dissolution in the electrolyte solution. Fourth, exposure of the lithium metal to the electrolyte can cause the lithium to become brittle and possibly fracture.

When the battery cell charges and discharges, the cell itself tends to expand and contract with the cycles. The expansion and contraction of the surrounding environment exerts force on the lithium metal, causing it to flex, become brittle, and eventually break. Fifth, the bare lithium can lead to a difficulty in "wetting" the current collectors. The electrolyte needs to seep in at a reasonable rate to the electrodes to form the ion channels through which the lithium can move. Finally, lithium metal is not stable at all temperatures and can degrade in high/low temperature ranges.

Figure 5A:
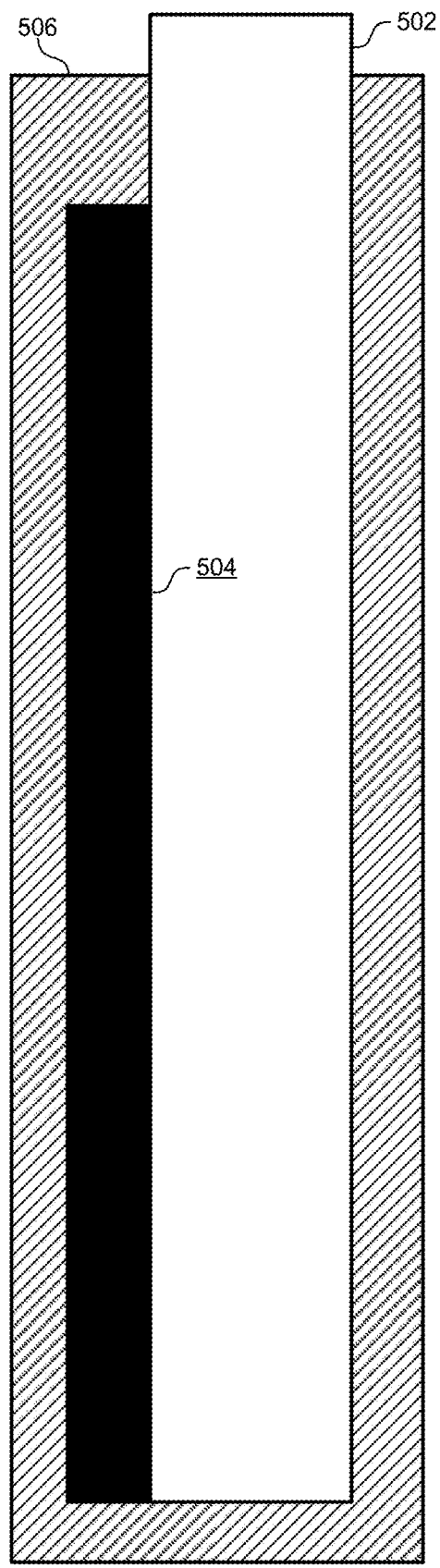
FIG. 5A illustrates a diagram of an example lithium electrode, according to some embodiments.

To overcome these difficulties, the embodiments provided herein construct a special third electrode that provides the benefits of lithium metal while preventing the drawbacks described above in a commercial battery cell that can be used in real-world applications. FIG. 5A illustrates a diagram of an example lithium electrode, according to some embodiments. This electrode includes a lithium metal strip 504 laminated onto a copper wire 502 within a film of conductive polymer 506. The polymer 506 may be ionically conductive such that it can interact with the environment of the battery cell. The polymer 506 may include conductive polymer materials, such as polyethylene oxide (PEO), polypyrrole, poly (3,4-ethylenedioxythiophene), polystyrene sulfonate (PEDOT:PSS), polythiophenes, polyindoles, polypyrenes, and/or any other ionically conductive polymer.

Note that the relative size of the wire 502, the lithium metal strip 504, and/or the polymer film 506 are not drawn to scale in FIG. 5A. Instead, the relative size of the lithium metal strip 504 and the polymer 506 have been exaggerated in order to illustrate how these different layers can be used to construct a third electrode lead. Also note that the polymer 506 can be applied such that it completely covers the lithium metal strip 504. Thus, the polymer film 506 can be applied such that the top of the polymer film 506 encloses the top of the lithium metal strip 504 as illustrated in FIG. 5A. This allows the electrode to be inserted into the battery cell above the level of the polymer 506 without allowing the lithium metal strip 504 to come in contact with the electrolyte or other battery environment.

Figure 5B:
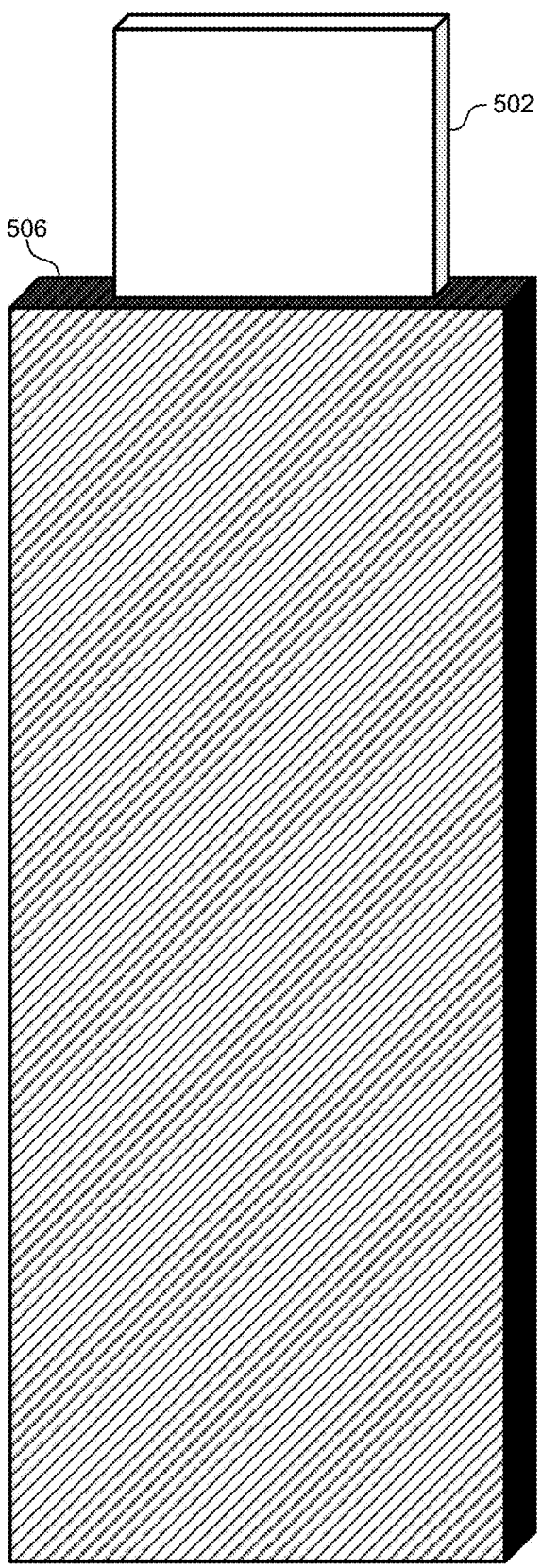
FIG. 5B illustrates a diagram of an external view of the lithium electrode, according to some embodiments.

FIG. 5B illustrates a diagram of an external view of the lithium electrode, according to some embodiments. Again, the relative size of the wire 502 and the polymer 506 are not drawn to scale, but are instead exaggerated to illustrate how the polymer 506 can completely cover the lithium metal strip 504. The structure of the coated lithium reference can be a simple rectangular geometry as illustrated in FIG. 5B. The lithium metal itself can be pressed, hot pressed, welded, or electroplated onto the wire 502. The wire can be made of various conductive materials, such as copper or aluminum. Next, the polymer 506 coating can be added via sputtering, dip-coating, spin-coating, electrodeposition, templating, and so forth.

The polymer film 506 that is applied to the lithium metal strip 504 solves many of the problems described above that would otherwise accompany the use of lithium metal for an electrode in a battery environment. For example, the polymer 506 provides protection against the electrochemical environment of the battery cell. As described above, the liquid electrolyte can embrittle the lithium 504 making it mechanically unstable. The polymer 506 minimizes the exposure to the liquid electrolyte, and thereby protects the lithium metal 504. The polymer 506 also prevents the formation of the passivation layer of SEI and thermally insulates the lithium metal 504 from temperature changes within the battery cell. This provides improved mechanical strength and allows for in-situ, half-cell measurements in commercial use battery cells. These measurements also provide improved accuracy for most BMS algorithms.

Figure 6:
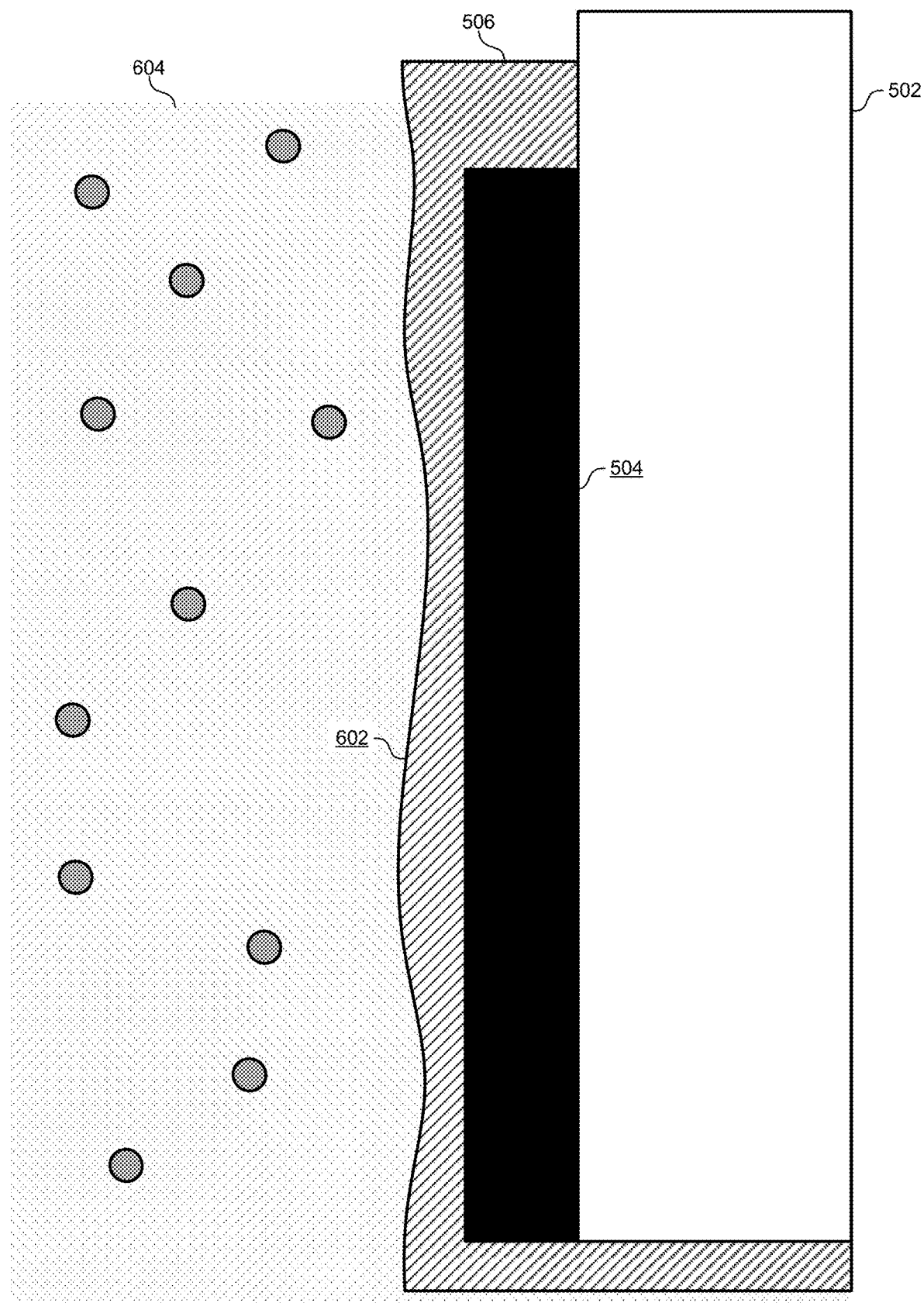
FIG. 6 illustrates an example of how the polymer can provide mechanical strength to the lithium electrode, according to some embodiments.

FIG. 6 illustrates an example of how the polymer 506 can provide mechanical strength to the lithium electrode 504, according to some embodiments. Specifically, one of the problems described above with using a bare lithium reference is the mechanical fluctuation that occur in the battery cell that may cause the lithium metal to fracture over time. The polymer 506 contributes to the mechanical robustness of the lithium metal 504 because it is essentially a plastic laminate that absorbs much of the expansion and contraction of the surrounding environment. For example, as the surrounding electrolyte 604 is compressed, the polymer 506 can absorb much of the force applied to the third electrode. The deformation at the surface 602 of the polymer 506 can absorb the force and attenuate the force that is eventually applied to the lithium metal 504.

Figure 7:
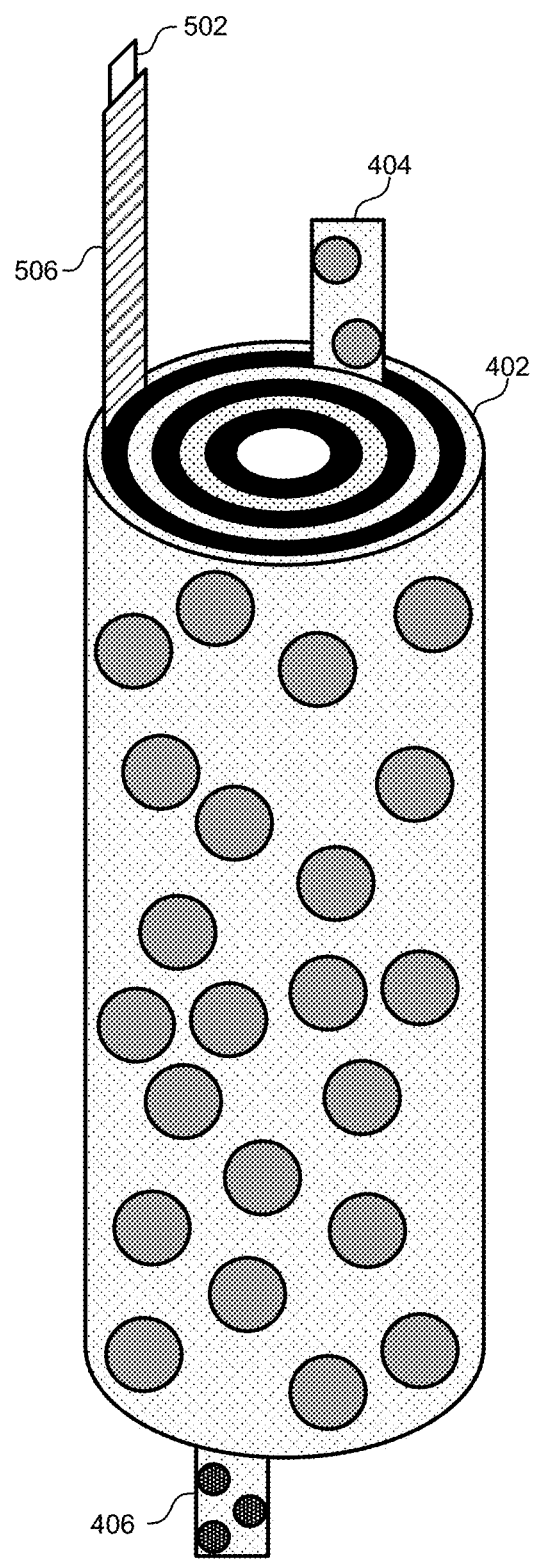
FIG. 7 illustrates how the coated lithium metal reference electrode can be inserted into an existing battery cell during or after manufacture, according to some embodiments.

FIG. 7 illustrates how the coated lithium metal reference electrode can be inserted into an existing battery cell during or after manufacture, according to some embodiments. After the manufacturing of the lithium reference, the wire 502 with the coating of polymer 506 can be inserted into a cylindrical cell, such as the jelly roll 402. In other embodiments, different battery configurations other than a jellyroll may be used. For example, the lithium electrode may also be inserted into a pouch cell or a prismatic cell. In the jellyroll 402, the lithium reference can be inserted between the jellyroll and the can of the battery. Alternatively, the lithium reference can be inserted between anode and cathode layers of the jellyroll. The relatively flat structure of the coated lithium reference allows for the reference to be readily inserted between layers of the electrodes and/or separators. After inserting the lithium reference into the jellyroll 402, at least a portion of the lithium reference can extend out of the jellyroll 402. In some embodiments, the polymer 506 can extend out of the jellyroll 402 or other battery cell arrangement such that the lithium metal inside the polymer 506 is completely protected.

Figure 8:
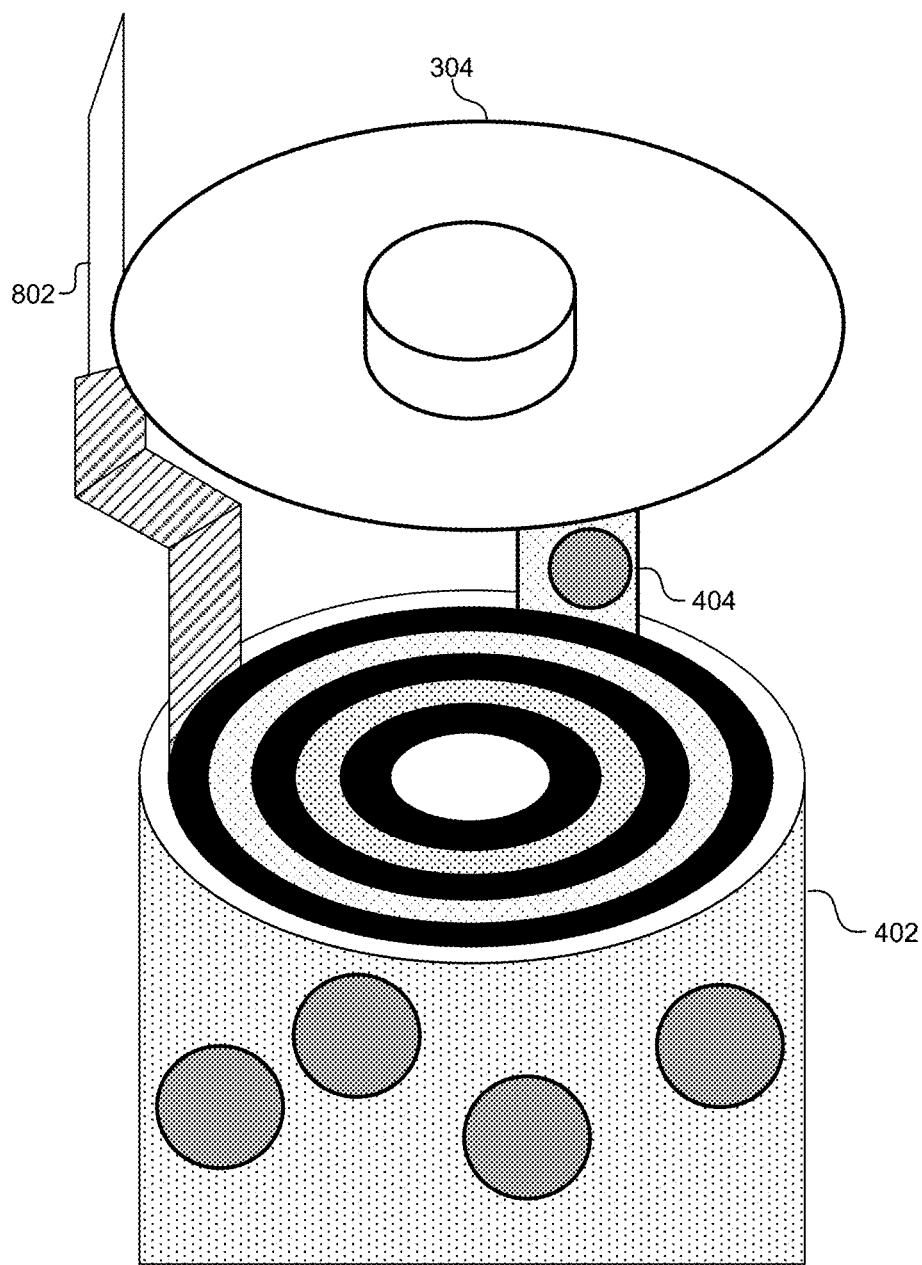
FIG. 8 illustrates a jellyroll with the reference electrode inserted prior to sealing the battery cell, according to some embodiments.
Figure 9:
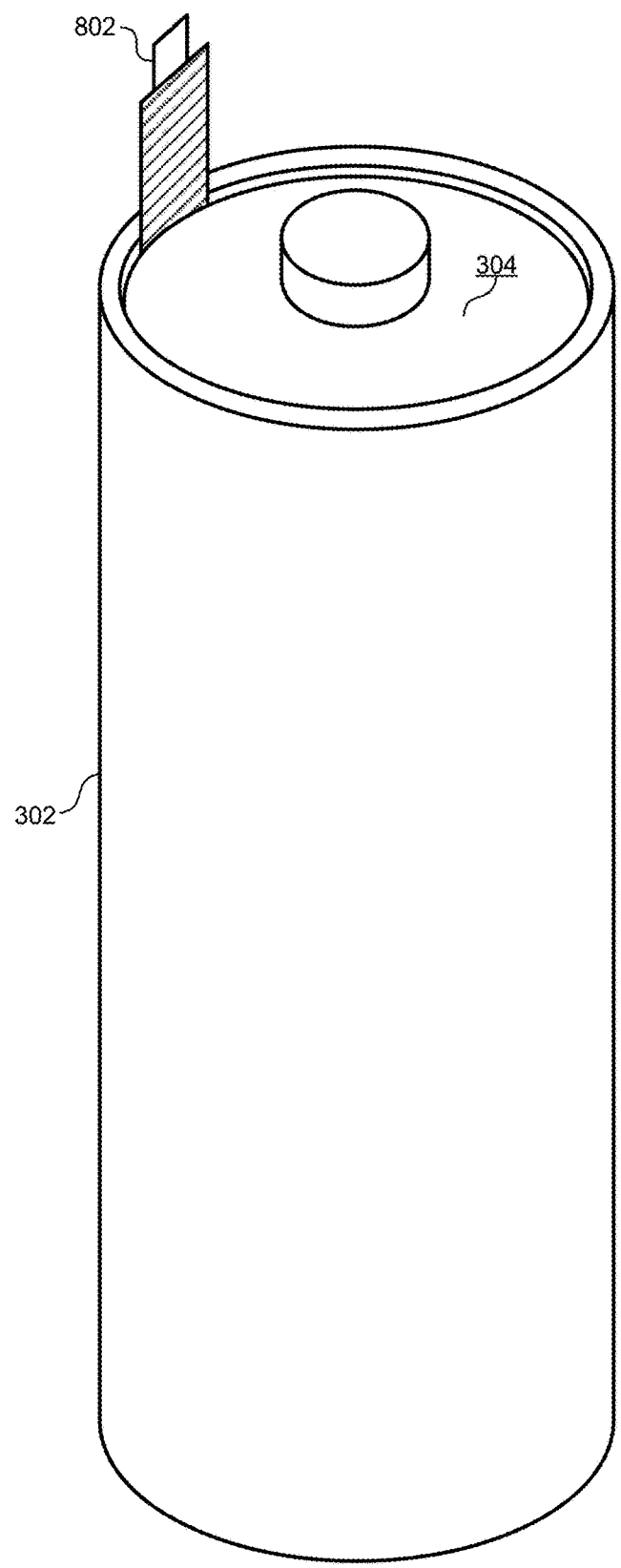
FIG. 9 illustrates a can that has been closed around the cap to seal the battery cell while leaving the electrode exposed, according to some embodiments.

FIG. 8 illustrates a jellyroll 402 with the reference electrode 802 inserted prior to sealing the battery cell, according to some embodiments. The reference 802 can be left exposed and the cap 304 can be sealed around the lithium reference electrode 802 such that the wire portion of the electrode 802 is accessible outside the cap 304. The anode lead 404 can be welded to the underside of the cap 304, while the reference 802 can be routed around the cap 304. Although not shown explicitly in FIG. 8, the can may then be folded around the top of the cap 304 to seal the battery cell. FIG. 9 illustrates a can 302 that has been closed around the cap 304 to seal the battery cell while leaving the electrode 802 exposed for connection to, for example, the BMS of an electric vehicle. Alternatively, for prismatic or pouch cells, the case may be laser-welded shut around the electrode 802.

Figure 10A:
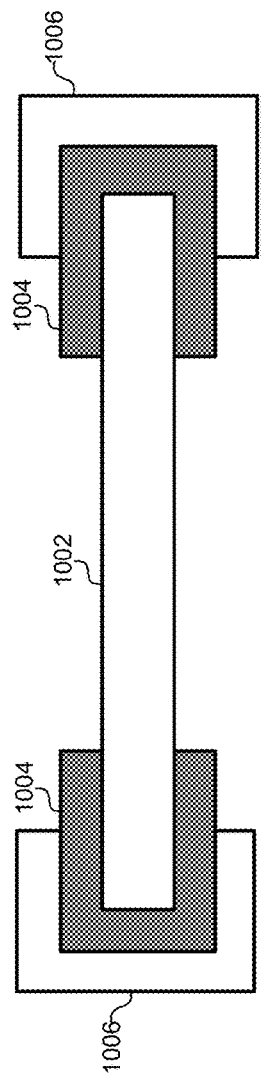
FIGS. 10A-10B illustrate the use of the double-electrode cap, according to some embodiments.
Figure 10B:
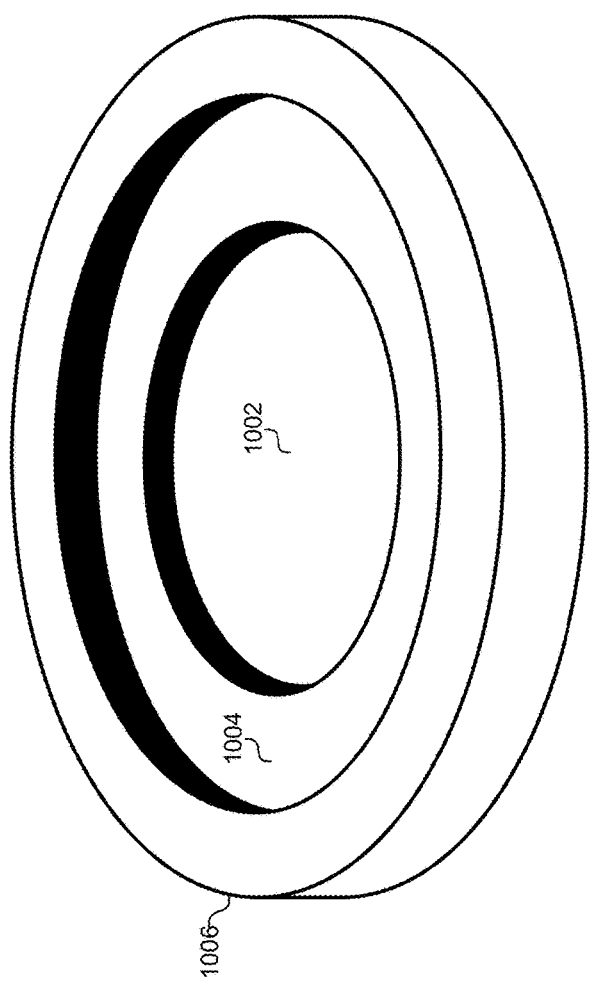

FIGS. 10A-10B illustrate the use of the double-electrode cap, according to some embodiments. Generally, the cap can be characterized as having a first metal region and a second metal region that can function as two different electrodes. The first metal region can be separated from the second metal region by an insulator such that they are electrically isolated. The first metal region and the second metal region can both be exposed on the top and bottom of the cap such that they can be measured from the top of the cap and coupled to the electrical leads from the jelly roll on the bottom of the cap. In a specific example illustrated in FIGS. 10A-10B, the first metal region may include an aluminum disk 1002. The aluminum disk 1002 may include an insulator 1004 that is crimped around the outer circumference of the aluminum disk 1002. The second metal region can include another aluminum piece 1006 that is crimped around the insulator 1004. When attaching the cap to the rest of the battery assembly, a polymer seal can be placed around the exterior of the cap, and the cap can then be crimped onto the rest of the battery cell.

The first metal region and the second metal region of the cap may both be welded or soldered to different electrodes in a three-electrode cell. For example, instead of leaving the reference electrode 802 exposed by routing it around the cap, configurations using this dual-electrode cap can instead couple the anode to the first metal region and couple the reference electrode to the second metal region. Alternatively, the anode can be coupled to the first metal region and the cathode can be coupled to the second metal region, with the reference electrode being coupled to the can of the battery cell.

Figure 11:
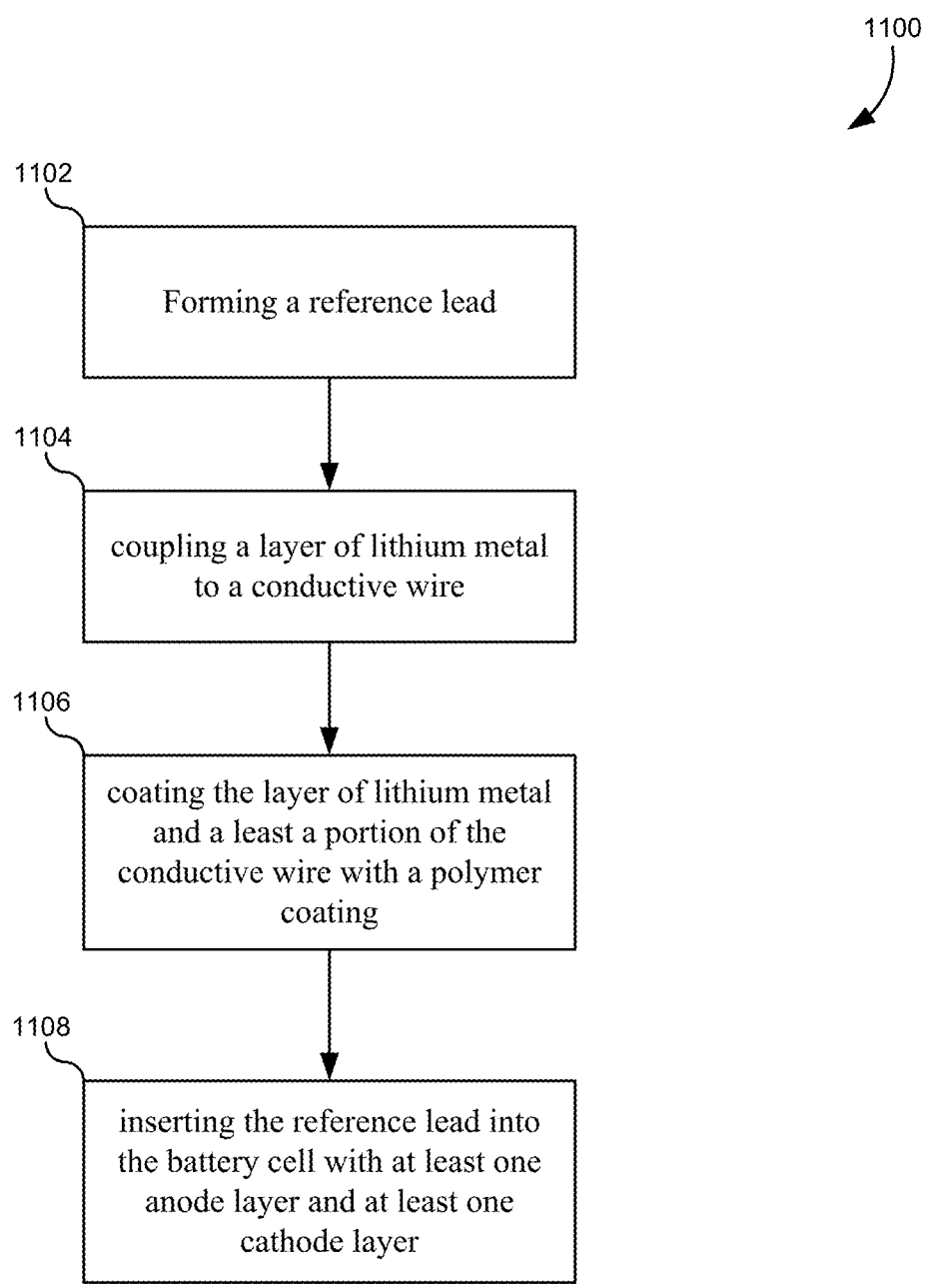
FIG. 11 illustrates a flowchart of a method for providing a battery cell with a coated lithium reference lead, according to some embodiments.

FIG. 11 illustrates a flowchart 1100 of a method for providing a battery cell with a coated lithium reference lead, according to some embodiments. The method may include forming a reference lead (1102). Forming the reference lead may be performed by coupling a layer of lithium metal to a conductive wire (1104). The conductive wire may be formed from copper, aluminum, and/or other metals. The method may also include coating the layer of lithium metal and at least a portion of the conductive wire with a polymer coating (1106). The method may further include inserting the reference lead into the battery cell with at least one anode layer and at least one cathode layer (1108).

It should be appreciated that the specific steps illustrated in FIG. 11 provide particular methods of assembling a three-electrode battery cell according to various embodiments. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 12:
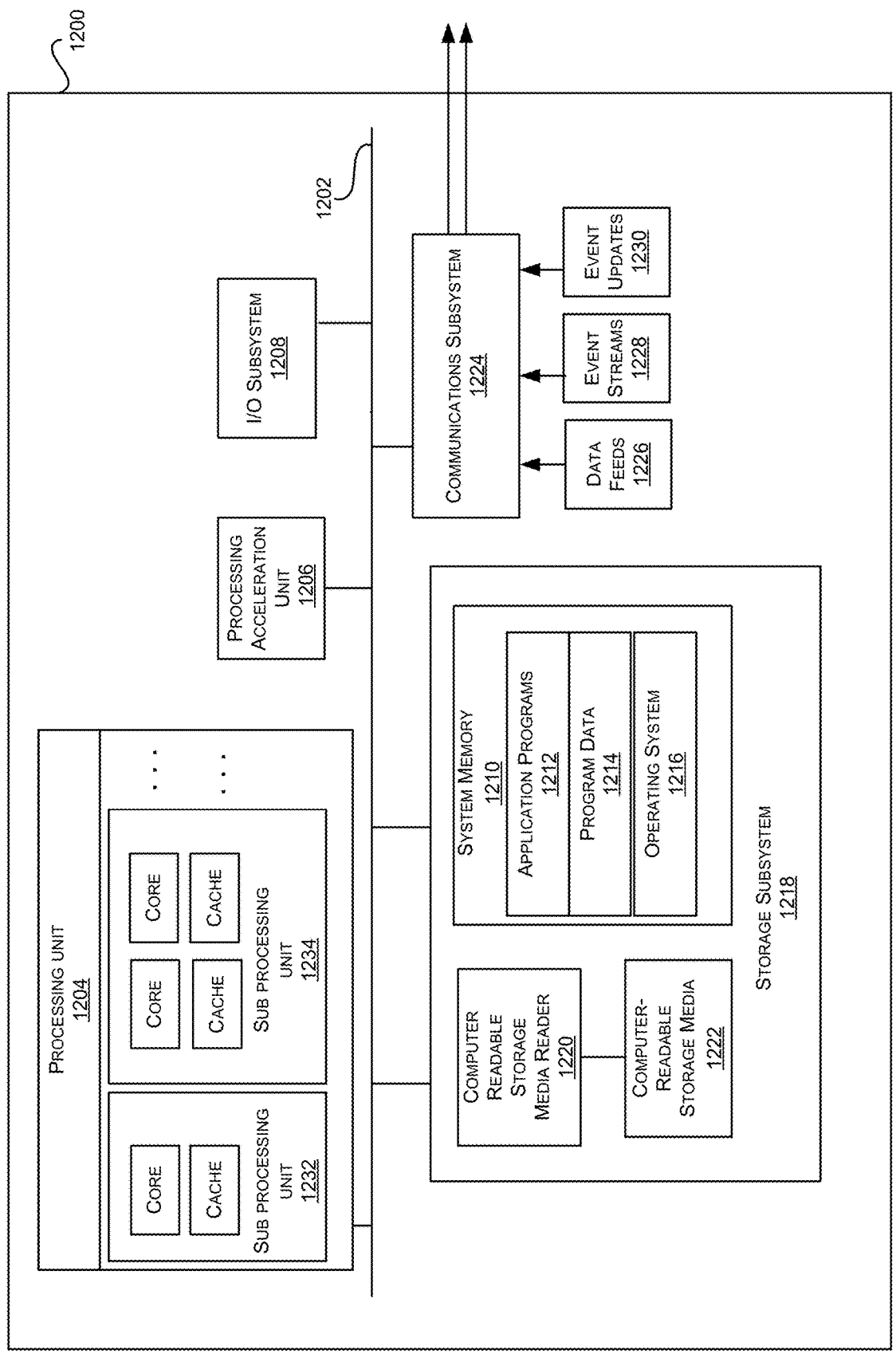
FIG. 12 illustrates an exemplary computer system, in which various embodiments may be implemented.

The BMS system described above that measures and uses the readings from the lithium reference lead may be implemented by a computer system that comprises an internal system in an electric vehicle, a remote server, a dedicated simulation system, and/or a distributed combination of these various configurations. FIG. 12 illustrates a computer system 1200 that has been specifically designed to implement the BMS or testing systems described herein. Specifically, these hardware and software modules depicted in FIG. 12 may be part of the BMS, part of a simulation system, and/or part of a remote server. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present invention.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A battery cell providing a coated lithium reference lead, the battery cell comprising:
   a casing;
   at least one anode layer;
   at least one cathode layer; and
   a reference lead comprising:
      a conductive wire;
      a layer of lithium metal coupled to the conductive wire; and
      a conductive polymer coating that covers the layer of lithium metal and covers at least a portion of the conductive wire;
   wherein the reference lead is inserted into the battery cell with the at least one anode layer and the at least one cathode layer without perforating the casing of the battery cell.

2. The battery cell of claim 1, wherein the conductive polymer comprises an ionically conductive polymer.

3. The battery cell of claim 1, wherein the layer of lithium metal is pressed onto an end length of the conductive wire.

4. The battery cell of claim 1, wherein, after the layer of lithium metal is coupled to the conductive wire, the layer of lithium metal and the conductive wire are dipped into the polymer.

5. The battery cell of claim 1, wherein the battery cell comprises a jelly roll comprising the at least one anode layer and the at least one cathode layer.

6. The battery cell of claim 5, wherein the reference lead is inserted between layers of the at least one anode layer and the at least one cathode layer in the jelly roll.

7. The battery cell of claim 1, wherein the battery cell comprises a prismatic cell.

8. The battery cell of claim 1, wherein the battery cell comprises a pouch cell.

9. The battery cell of claim 5, wherein the reference lead is inserted between the jelly roll and the casing of the battery cell.

10. The battery cell of claim 6, wherein at least a portion of the reference lead extends out of the jelly roll.

11. The battery cell of claim 1, wherein the reference lead is inserted into the battery cell prior to sealing the battery cell.

* * * * *